United States Patent [19]

Carlsen et al.

[11] Patent Number: 6,056,934
[45] Date of Patent: May 2, 2000

[54] METHOD AND DEVICE FOR HYDROGEN SULFIDE ABATEMENT AND PRODUCTION OF SULFURIC ACID

[75] Inventors: Bruce Carlsen, Calipatria; Allen Sonneville, Brawley, both of Calif.

[73] Assignee: MidAmerican Energy Holdings Co., Omaha, Nebr.

[21] Appl. No.: 09/075,024

[22] Filed: May 8, 1998

[51] Int. Cl.$^7$ .................................................. C01B 17/69
[52] U.S. Cl. .................. 423/522; 423/573.1; 423/576.8; 423/DIG. 17; 435/266
[58] Field of Search ................................ 423/573.1, 522, 423/576.8, DIG. 17; 435/266

[56] References Cited

U.S. PATENT DOCUMENTS

| | | | |
|---|---|---|---|
| 4,242,448 | 12/1980 | Brown, III | 435/42 |
| 5,256,570 | 10/1993 | Clyde | 435/285 |
| 5,354,458 | 10/1994 | Wang et al. | 210/180 |
| 5,387,344 | 2/1995 | McCombs et al. | 210/617 |
| 5,480,538 | 1/1996 | McCombs et al. | 210/151 |
| 5,482,630 | 1/1996 | Lee et al. | 210/605 |
| 5,494,574 | 2/1996 | Unterman et al. | 210/150 |
| 5,514,278 | 5/1996 | Khudenko | 210/605 |
| 5,556,536 | 9/1996 | Turk | 210/150 |
| 5,578,214 | 11/1996 | Yamasaki et al. | 210/650 |
| 5,616,241 | 4/1997 | Khudenko | 210/151 |
| 5,618,730 | 4/1997 | Eder et al. | 435/289.1 |
| 5,635,394 | 6/1997 | Horn | 435/266 |
| 5,661,027 | 8/1997 | Takeuchi et al. | 435/266 |

FOREIGN PATENT DOCUMENTS

| | | | |
|---|---|---|---|
| 0 359 969 A1 | 3/1990 | European Pat. Off. | 435/266 |
| 0 442 110 A1 | 8/1991 | European Pat. Off. . | |
| 2331367 | 6/1977 | France | 435/266 |

OTHER PUBLICATIONS

Aroua et al., "Temperature Dependency of the Equilibrium Constant for the Formation of Carbamate From Diethanolamine," *Journal of Chemical and Engineering Data*, 42#4:692–96 (Jul.–Aug. 1997).

Bedell et al., "Chelation Chemistry in Geothermal H$_2$S Abatement," *Geothermal Resources Council Bulletin* (Aug. 1987) pp. 3–6.

Bhatia et al., "One–step Process Takes H$_2$S From Gas Stream," *Oil & Gas Journal*, Technology (Oct. 20, 1986) 44–49.

Cassinis et al., "Improved H$_2$S Caustic Scrubber," SPE 67th Annual Western Regional Meeting (Long Beach, CA Jun. 25–27, 1997) *Proceedings* 203–210 (1997).

"Chementator," *Chemical Engineering*, 104#7:17–25 (Jul. 1997).

Hsu et al., "Viscosities of Aqueous Blended Amines," *Journal of Chemical and Engineering Data*, 42#4:714–20 (Jul.–Aug. 1997).

Lanting et al., "Biological Removal of Hydrogen Sulfide from Biogas," 46th Annual Purdue Industrial Waste Conference (May 14–16, 1991).

Lee et al., "Oxygen Enhanced Claus Operation: A Case Study," *Petroleum Technology Quarterly*, 73–75 (Summer 1997).

Leppaelahti et al., "Selective Catalytic Oxidation of NH$_3$ in Gasification Gas. 1. Effect of Iron Sinter and Dolomite on the Reactions of NH$_3$, NO, and O$_2$ in Gasification Gas," *Energy & Fuels*, 11#1:30–38 (Jan.–Feb. 1997).

Leson et al., "Biofiltration: An Innovative Air Pollution Control Technology For VOC Emissions," *Journal of the Air & Waste Management Association*, 41#8:1045–1054 (Aug. 1991).

McNamara et al., "Mercury, Natural Gas and Activated Carbon," *Hydrocarbon Asia*, 7#4:76–80 (May–Jun. 1997).

Nicoll et al., "Dow's SulFerox* in Korea," *Hydrocarbon Asia*, 7#4:82–83 (May–Jun. 1997).

*Petroleum Technology Quarterly*, 118 (Summer 1997).

Salem et al., "Removal of Sulfur Compounds from Naphtha Solutions Using Solid Adsorbents," *Chemical Engineering & Technology*, 20#5:342–47 (Jun. 1997).

Sullivan et al., "Converting Sulphide Biologically," *Petroleum Technology Quarterly*, 33–35 (Summer 1997).

Williams et al., "How to Drop the Slop—Hard Lessons Learned in Treating Midway Sunset's Heavy Crude," SPE 67th Annual Western Regional Meeting (Long Beach, CA Jun. 25–27, 1997) *Proceedings*, 753 (1997).

Zacher et al., "Amine Unit Cost Elements," *Petroleum Technology Quarterly*, 99–100, 102, 104–5 (Summer 1997).

*Primary Examiner*—Steven P. Griffin
*Assistant Examiner*—Timothy C Vanoy
*Attorney, Agent, or Firm*—Morrison & Foerster LLP

[57] ABSTRACT

A process is provided for removing hydrogen sulfide out of gas, such as gas separated from geothermal brine, by passing the hydrogen sulfide containing gas and oxygen containing gas through a bioreactor containing bacteria, such as Beggiatoa, Thiothrix and Thiobacilli, supported on a support so that the bacteria oxide the hydrogen sulfide into elemental sulfur, which is subsequently oxidized into sulfuric acid. The flow of the gases through the bioreactor is cyclically reserved about every 12 hours to about 5 days so as to provide a better sulfur distribution in the support, resulting in more efficient oxidation of the elemental sulfur into sulfuric acid. Hydrogen sulfide depleted gas and sulfuric acid are discharged from the bioreactor. A plurality of bioreactors may be used, connected in series or in parallel.

8 Claims, 2 Drawing Sheets

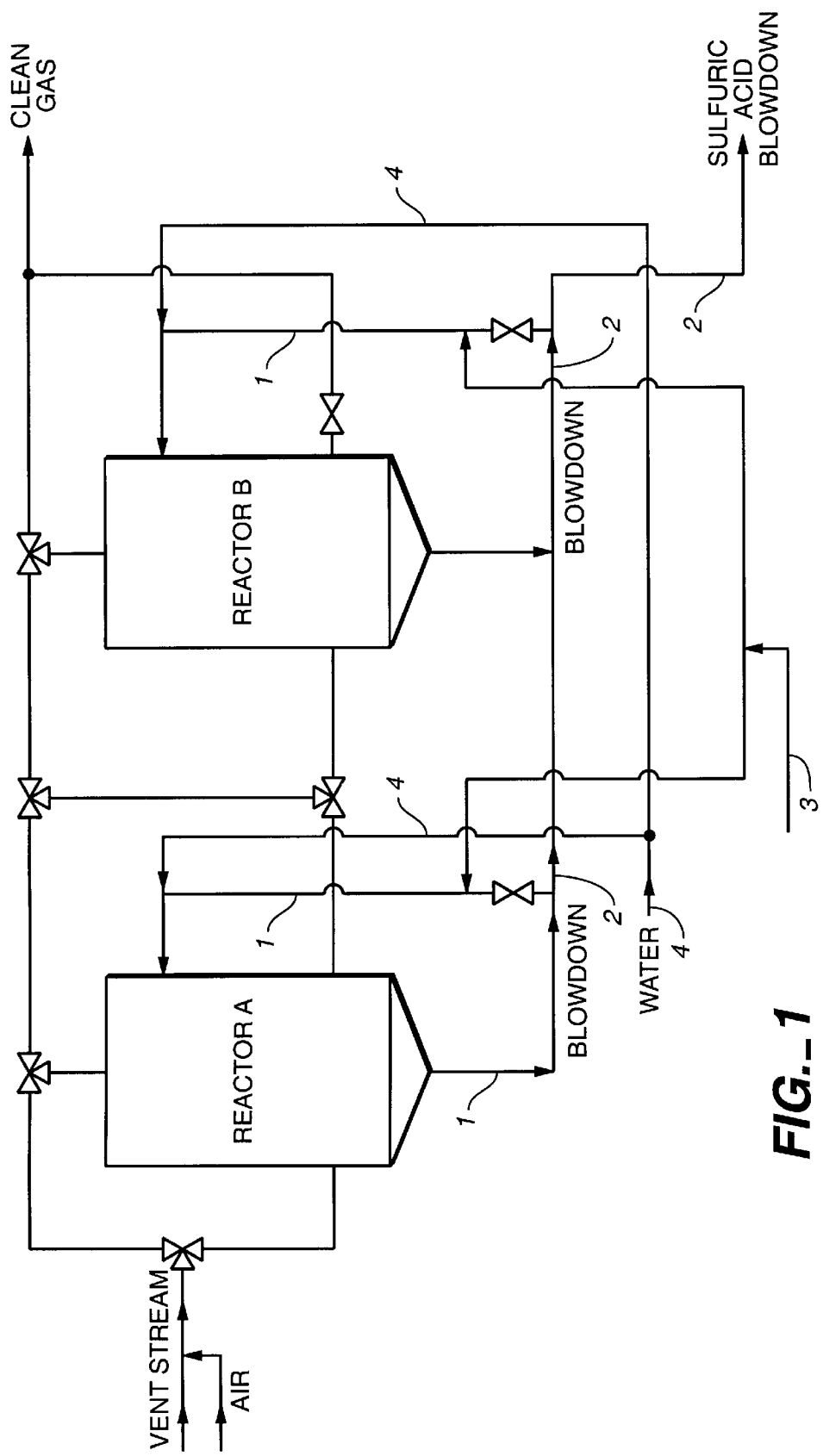
FIG._1

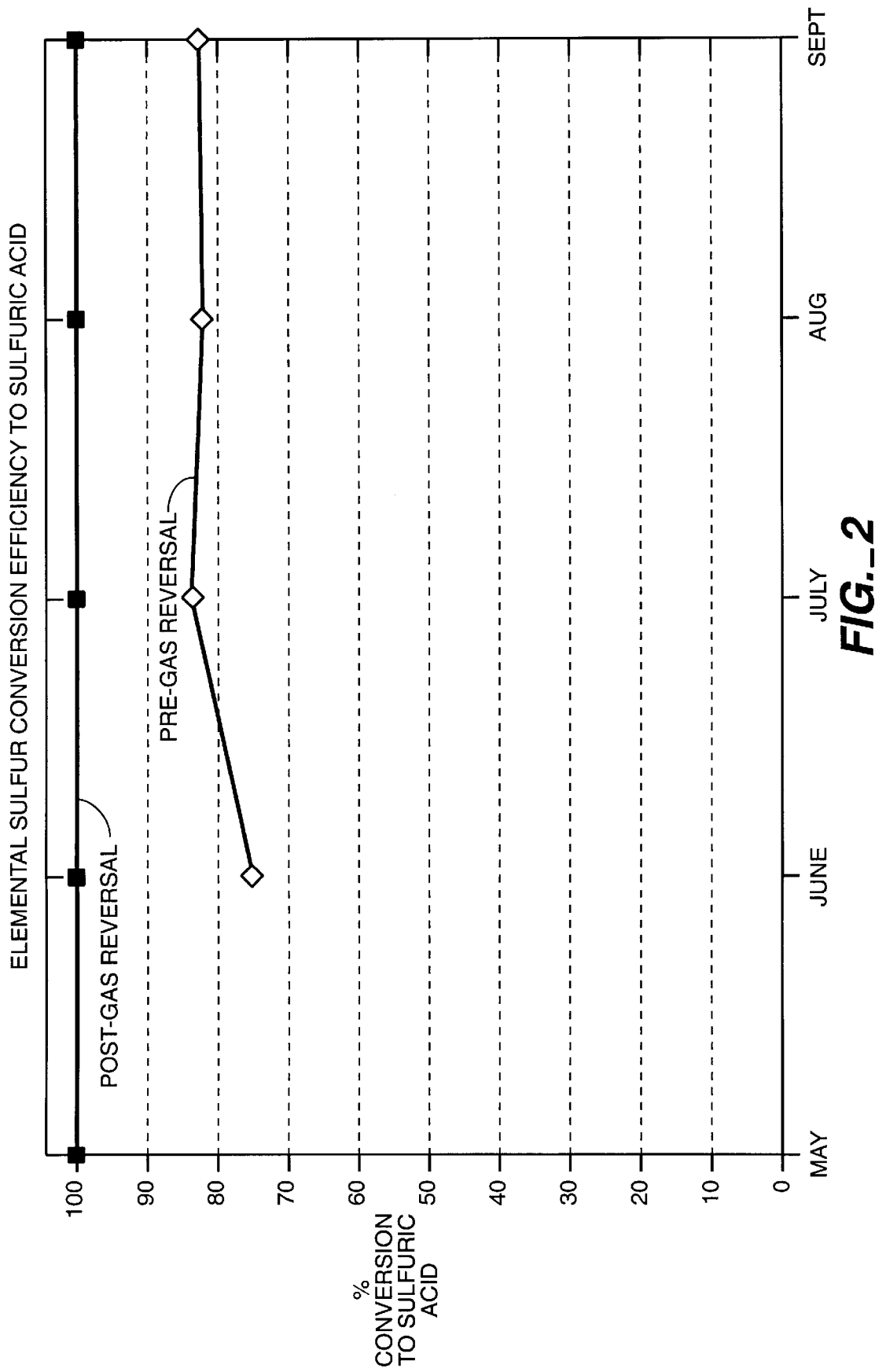

METHOD AND DEVICE FOR HYDROGEN SULFIDE ABATEMENT AND PRODUCTION OF SULFURIC ACID

TECHNICAL FIELD

The invention relates to the field of abatement of toxic and/or noxious gases, particularly the field of abatement of hydrogen sulfide gas. The invention further relates to the production of sulfuric acid from hydrogen sulfide gas. The invention further relates to the conversion of hydrogen sulfide gas in geothermal brine to sulfuric acid.

BACKGROUND ART

Hydrogen sulfide gas has a number of undesirable properties. At low concentrations (i.e., less than 10 parts per million), the gas has a strong odor of "rotten eggs". Paradoxically, at concentrations greater than 100 parts per million (ppm), the gas can no longer be smelled, but it will induce dizziness. Concentrations of greater than about 500 ppm can be fatal to humans. Hydrogen sulfide can also be oxidized to sulfur dioxide, a chemical that contributes to acid rain.

Hydrogen sulfide ($H_2S$) gas can be released by a variety of sources. Biologically-generated hydrogen sulfide is generally the product of anaerobic digestion of organic matter, and can be released by sewage treatment facilities, solid waste landfill, paper mill waste, cattle feed lots, poultry farms, and other industries employing anaerobic digestion for processing. $H_2S$ is also released by oil drilling operations, oil refinery operations, and operations utilizing geothermal brines, such as power generation.

Geothermal brines are of interest for several reasons. Geothermal formations containing brines heated to high temperature can be accessed by conventional drilling technology and are found in a variety of locales, including California. When a geothermal brine is brought to the surface and allowed to "flash", live steam is generated that can be used to drive turbines for the production of electricity. The brines also contain large quantities of commercially valuable metals, for example, lead, silver and zinc. However, when geothermal brines are flashed, they also release non-condensable gases, including $H_2S$. $H_2S$ concentrations in non-condensable gas streams from geothermal brines can be quite high, reaching levels in excess of 4000 ppm.

Abatement (i.e., removal or transformation of $H_2S$) can be accomplished by chemical or biological means. The object of $H_2S$ abatement systems is to convert $H_2S$ gas into elemental sulfur, a solid that can easily be collected. An older chemical process for $H_2S$ abatement, the Claus process, uses heat and oxygen to oxidize $H_2S$ to elemental sulfur. This process is not particularly efficient, however, and produces sulfur dioxide. Thus, a catalytic step is required to react the remaining $H_2S$ and the sulfur dioxide to form elemental sulfur. Dow Chemical Corporation and U.S. Filter Engineered Systems are vendors for newer technologies (sold under the tradenames SulFerox® and ARI LO-CAT II™, respectively). Both of these technologies utilize proprietary iron catalysts in liquid reactors for the conversion of hydrogen sulfide to elemental sulfur.

Biological technologies for $H_2S$ abatement are also available. Sulfur bacteria (i.e., bacteria that are able to metabolize sulfur compounds) can be utilized in "biofilter" or "bioscrubber" reactors to oxidize $H_2S$ to sulfates. Biofilter and bioscrubber plants are normally designed to produce elemental sulfur. In this process, $H_2S$ gas is passed over the bioreactor bed under aerobic conditions, leading to reduction of the $H_2S$ to elemental sulfur that is deposited intracellularly and extracellularly as a solid in clumps or granules. This elemental sulfur must be mechanically removed periodically from the bioreactor bed or the reactor will become clogged. The deposited sulfur, once removed, may be disposed of or utilized in industrial and/or agricultural processes. The further oxidation of sulfur by biofilter or bioscrubber reactors has been considered undesirable. Sulfuric acid, a strong acid, is the principle product of further oxidation of elemental sulfur by sulfur bacteria. Sulfuric acid has not been a desired product because it is highly corrosive (the sulfuric acid produced by sulfur bacteria generally has a pH of 1 to 2). Moreover, sulfate ions are so undesirable that bioreactor technology is available (for example, from THIOPAQ Sulfur Systems BV) for the biological conversion of sulfate to elemental sulfur. In this technology, anaerobic bacteria are employed to reduce sulfate to $H_2S$, which is then oxidized by aerobic sulfur bacteria to form elemental sulfur.

Lanting et al., "Biological Removal of Hydrogen Sulfide from Biogas", presented at the 46th Annual Purdue Industrial Waste Conference, May 14–16, 1991, disclose methods for the use of biological systems for the abatement of $H_2S$ from biological sources. The disclosed methods relate to the biological abatement of $H_2S$ by conversion into elemental sulfur. In this method, $H_2S$-containing gas is passed over a support medium coated with sulfur bacteria. Water and a nutrient fluid are circulated through the bioreactor bed. $H_2S$ is oxidized to elemental sulfur and sulfate, although elemental sulfur is the desired end product. The production of sulfates is noted, and actions to reduce or eliminate sulfate production are suggested. In the Lanting method, elemental sulfur is removed from the bioreactor by periodically flushing the reactor.

DISCLOSURE OF THE INVENTION

It is an object of the invention to provide a method for abatement of hydrogen sulfide gas using biological processes wherein sulfuric acid is the desired resulting end product.

In one embodiment, a gas stream containing $H_2S$ is passed through a bioscrubber said bioscrubber comprising at least one bioreactor vessel containing sulfur bacteria adherent to a support medium while a fluid stream is sprayed over the support medium in the bioreactor vessel. For oxygen-deficient gas streams, air is mixed with the gas stream prior to its introduction into the bioscrubber. The gas stream is reversed on a regular basis to facilitate the distribution of elemental sulfur throughout the bioscrubber and complete conversion of elemental sulfur to sulfuric acid. Good sulfur distribution optimizes the conversion of sulfur to sulfate.

BRIEF DESCRIPTION OF THE DRAWINGS

FIG. 1 is a schematic illustration of the reversible flow bioscrubber system.

FIG. 2 shows the efficiency of elemental sulfur conversion to sulfuric acid using the inventive method.

MODES OF CARRYING OUT THE INVENTION

A number of different sulfur bacteria genera are suitable for use within the method of the instant invention. "Sulfur bacteria" include species of Beggiatoa, Thiothrix, and Thiobacilli, although any acidophilic sulfur-oxidizing bacteria may be used. Suitable sulfur bacteria may be obtained from a variety of sources, including sulfur hot spring sediments, soil samples, and canals and cooling tower packings associated with industries utilizing geothermal wells.

The bioscrubber and associated equipment for use in the instant inventive method are preferably constructed of highly corrosion resistant materials. Sulfuric acid is produced in the instant $H_2S$ abatement process and, therefore, portions of the bioscrubber that come in contact with this product (such as the bioreactor vessel and blow down collection system) must be resistant to sulfuric acid, as will be apparent to one of skill in the art. Gas supply lines, conduits and gas ports must also be corrosion resistant, as $H_2S$-containing gases may be corrosive. Portions of the bioscrubber in contact with corrosive compounds are preferably constructed of materials such as fiberglass, fibercast, polyvinyl chloride and other plastics and the like.

Sulfur bacteria are inoculated into a bioscrubber comprising at least one bioreactor vessel packed with a support medium. The support medium is preferably retained within the bioreactor vessel by a permeable frit, disk, or filter or other apparatus that retains the support medium while allowing passage of gas and liquid. Suitable support media may include any material that is corrosion resistant, including metal, plastic, ceramic, soil, coke and the like. The support medium preferably has a large surface area to support a large growth of bacteria. A preferred support medium is polypropylene, such as Jaeger TRIPAC®. During inoculation, elemental sulfur may be added with the bacterial inoculant or sprinkled on the support medium to aid in the establishment and growth of the sulfur bacteria.

Once the bioscrubber is inoculated with sulfur bacteria, a nutrient solution is supplied. The nutrient solution contains the basic elements required for the growth and survival of the sulfur bacteria that are not supplied by some other source. The major nutrients required by sulfur bacteria are nitrogen, carbon, potassium, phosphorus, and sulfur. Micro nutrients are also provided, as will be apparent to one of ordinary skill in the art. Nitrogen is preferably supplied as ammonia, and may be supplied during the inoculation and establishment phases. In one embodiment, geothermal brine condensate is used as a nitrogen source. Because many $H_2S$-containing gas streams (such as non-condensable gas streams from flashed geothermal brines) contain ammonia, nitrogen supplementation may not be required after the bioscrubber is operational. Carbon can be supplied in the form of $CO_2$. Sufficient $CO_2$ may be available in the air, and $H_2S$-containing gas streams may contain further quantities of $CO_2$, such that no carbon supplementation is necessary. Potassium and phosphorus are preferably supplied by the addition of potassium phosphate to the nutrient solution. Solid elemental sulfur may be added to the bioreactor during the initial inoculation with sulfur bacteria, but the $H_2S$-containing gas streams will supply all necessary sulfur during operation. Micro nutrient supplementation may not be necessary if tap or industrial water is used to produce the nutrient solution. Micro nutrients may be added, however, where one or more micro nutrients is present in an insufficient amount, as will be apparent to one of ordinary skill in the art.

A nutrient solution is preferably sprayed into the bioscrubber under gentle pressure. The sulfur bacteria are normally loosely bound to the support medium and are, therefore, easily dislodged by a strong spray. Spraying may be indirect, for example, using a relatively strong stream or spray directed against the bioreactor vessel walls that "ricochets" off the vessel walls to spray the support medium. A preferred method of spraying utilizes one or more spray nozzles suspended above the support medium.

A nutrient solution is used to supply nutrients to the sulfur bacteria and to maintain moisture levels in the bioscrubber. The nutrient solution is preferably mixed in a tank and then pumped into the bioscrubber, but systems utilizing in-line mixing and/or utility water pressure are also useful. The flow should be controlled to maximize $H_2S$ removal from the $H_2S$-containing gas stream. The flow rate will be determined by the size and configuration of the bioscrubber. Preferably, the nutrient solution is sprayed into the bioscrubber at a flow rate of about 100 to about 200 gpm, or 0.75 to 3 gpm/ft$^2$.

The temperature of the bioscrubber should be maintained at about 25–45° C. Preferably the bioscrubber is maintained at about 35–40° C. If necessary, the temperature may be maintained by circulating a temperature-controlled fluid within a jacket surrounding the bioreactor vessel core, heating or cooling the air space within the bioreactor vessel, heating or cooling the $H_2S$-containing gas stream in-line, or heating or cooling the nutrient solution or any combination thereof. Cooling is unlikely to be necessary, unless the ambient temperature in the area of the bioscrubber is high or the $H_2S$-containing gas stream is very hot. Alternatively, heating may not be necessary where the either the ambient temperature or the $H_2S$-containing gas stream provides sufficient heat to maintain the bioscrubber's temperature within the preferred operating range.

The $H_2S$-containing gas stream should contain sufficient oxygen to allow for the complete oxidation of $H_2S$ to sulfuric acid. Many $H_2S$-containing gas streams do not contain sufficient oxygen to support the oxidation of $H_2S$ to sulfuric acid, so the source $H_2S$-containing gas streams may require oxygen supplementation. Oxygen supplementation may be performed by adding oxygen gas to the source $H_2S$-containing gas stream or by mixing air with the source $H_2S$-containing gas stream. Preferably, a source $H_2S$-containing gas stream lacking sufficient oxygen is supplemented by mixing with air.

After the sulfur bacteria are established in the bioscrubber, the $H_2S$-containing gas stream is directed through gas supply lines into the bioscrubber. The $H_2S$-containing gas stream is directed through a first gas port into a bioreactor vessel where it flows over the support medium. Sulfur bacteria on the support medium in the bioreactor vessel oxidize $H_2S$ to elemental sulfur. Elemental sulfur is deposited as granules both intra- and extra-cellularly. $H_2S$-depleted gas is directed to a gas outlet through a second gas port. The gas ports may be installed in any arrangement, such as top/bottom, sides, or axial/peripheral. A top/bottom gas port arrangement is preferred.

An $H_2S$-containing gas stream is introduced through the first gas port for a cycle. The length of a cycle is from about 12 hours to about 5 days, or from about 36 hours to about 3 days, or from about 24 hours to about 3 days, or from about 24 hours to about 2 days, or from about 12 hours to about 2 days. At the end of the cycle, the gas flow is reversed (i.e., the $H_2S$-containing gas stream is introduced via the second gas port, and the $H_2S$-depleted gas is directed to a gas outlet via the first port) for a second cycle. Cycling is continued throughout the operation of the bioscrubber, and the gas flow is reversed at the end of each cycle.

Reversal of gas flow is preferably accomplished by switching of valves located on the conduits between the gas supply, the gas outlet, and the first and second gas ports. The conduits may be arranged such that separate conduits and valves control the flow from the gas supply to the two gas ports and from the two gas ports to the gas outlet. This type of arrangement allows the use of simple "on/off" type valves for control of gas flow. Another design links the gas supply and gas outlet to multi-position valves, where a single valve can be used to select either the first or second gas port. A further design places multi-position valves on the first and second gas ports, which each allow selection between the gas supply and gas outlet conduits.

Reversal of the gas flow results in better sulfur distribution in the support medium, thereby resulting in more efficient oxidation of elemental sulfur to sulfuric acid. The sulfuric acid greatly reduces the pH of the nutrient flow to approximately pH 1 to 2, greatly reducing or eliminating growth of nonacidophilic sulfur bacteria in the bioreactor. Nutrient flow containing sulfuric acid drains to the bottom of the bioreactor vessel. This liquid is removed from the bioreactor vessel by a liquid outlet drain located in the bottom of the vessel. The sulfuric acid may be collected and used in industrial processes requiring sulfuric acid.

The bioreactor vessel may be any shape, although the walls of the vessel are preferably substantially vertical. Preferably, the bottom surface of the interior is sloped or curved to channel blow down liquids into a blow down liquid drain. The preferred bioreactor vessel has a shape that provides good gas and liquid distribution across the support medium.

The method of the present invention may be employed in bioscrubbers having one or more bioreactor vessels. The bioreactor vessels may be operated separately or may be connected. If the bioreactor vessels are connected, the gas ports may be linked in series (i.e., the second gas port of bioscrubber 1 linked to the first gas port of bioscrubber 2) or in parallel (i.e., each gas port 1 is connected to a first manifold and each gas port 2 is connected to a second manifold).

All patents and publications disclosed herein are hereby incorporated by reference in their entirety.

EXAMPLES

Example 1
Operation of Bioscrubber

Noncondensable gases (NCG) in the vent stream entered the plant at about 14.8 psia. Blowers were employed to increase the inlet gas pressure by about 42" water column in order to push the gas through the reactors that were piped in series. Ambient air was filtered and introduced into the system by blowers. After the air and the (NCG) in the vent stream were mixed at a ratio of approximately 1:4, the mixture of gases was distributed into the first bioreactor, reactor A in FIG. 1, which was 2600 ft$^3$ and was packed with 1582 ft$^3$ of 1" spherical-shaped Jaeger TRIPAC®.

The reactor temperature should be between approximately 100–120° F. In order to keep the temperature above 100° F., a 10 psig steam line injects steam into the NCG/Air mixture.

A circulating solution 1 was pumped 150 to 200 gpm into the top of the reactor and gently sprayed onto the top of the bioreactor bed. The down-flowing circulating solution wetted the support medium and, in one cycle, counter-currently contacted the up-flowing gases. Hydrogen sulfide present in the gases was absorbed by the circulating solution, oxidized to elemental sulfur by the bacteria present on the support medium. The elemental sulfur then was deposited on the support medium. The circulating solution exited the bottom of the bioreactor and was pumped back to the top of the reactor through spray nozzles. A small blowdown 2 or purge stream was split off the pumped circulating solution stream to remove sulfuric acid from the system. The pH balance of the circulating solution was maintained at approximately 1.0 to 2.0 by introducing water 4 to the circulating solution.

An injection system supplied a nutrient solution to the bacteria residing in the bioreactors in an amount of approximately 0.212 gph. A potassium phosphate salt nutrient solution 3 was pumped into the circulating solution lines to mix with the circulating solution and provide the bacteria with the necessary nutrients as it wetted the support medium.

After contacting the circulating solution on the support medium in reactor A, the clean gas exits to reactor B. The first reactor in the series, in this example reactor A, accumulates the elemental sulfur while in the second reactor, reactor B, the elemental sulfur is converted to sulfuric acid. After a period of time, i.e., 0.5 to 2 days, the flow of the noncondensable gases to the reactors was reversed and the second cycle was continued approximately the same time period. This method, employing a reversal of the noncondensable gas stream, resulted in the conversion of approximately 99.999% of the hydrogen sulfide gas present in the vent stream to sulfuric acid, a surprisingly unexpected improvement in the conversion of hydrogen sulfide to sulfuric acid as compared to known methods as shown in FIG. 2.

We claim:

1. A method for producing sulfuric acid from a H$_2$S-containing gas stream, comprising:

introducing a H$_2$S-containing gas stream and oxygen containing gas into a bioscrubber through a first gas port and venting H$_2$S-depleted gas through a second gas port, said bioscrubber comprising at least one bioreactor vessel and acidophilic sulfur oxidizing bacteria adherent to a support medium contained by said vessel;

reversing gas flow after a period of time ranging from about 12 hours to about 5 days, such that said H$_2$S-containing gas stream is introduced into said bioscrubber through said second gas port and said H$_2$S-depleted gas is vented through said first gas port; and collecting sulfuric acid.

2. The method of claim 1, wherein said H$_2$S-containing gas stream is separated from geothermal brine.

3. The method of claim 1, wherein said period of time ranges from about 24 hours to about three days.

4. The method of claim 1, wherein said period of time ranges from about 36 hours to about two days.

5. The method of claim 1, wherein said bioscrubber comprises at least two bioreactor vessels.

6. The method of claim 5, wherein said bioreactor vessels are connected in series.

7. The method of claim 5, wherein said bioreactor vessels are connected in parallel.

8. The method of claim 1, wherein said acidophilic sulfur oxidizing bacteria are a species of Beggiatoa, Thiothrix or Thiobacilli.

* * * * *

UNITED STATES PATENT AND TRADEMARK OFFICE
CERTIFICATE OF CORRECTION

PATENT NO. : 6,056,934

DATED : May 2, 2000

INVENTOR(S) : Bruce CARLSEN and Allen SONNEVILLE

It is certified that error appears in the above-identified patent and that said Letters Patent is hereby corrected as shown below:

IN OTHER PUBLICATIONS:

Page 1, Column 2, line 2 of the fourth reference, "Hydrocarbon Asia" should be --*Hydrocarbon Asia*--.

IN THE ABSTRACT:

Page 1, column 2, line 3, "and oxygen" should be --and an oxygen--.

Page 1, column 2, line 5, "Beggiatoa, Thiothrix and Thiobacilli" should be --*Beggiatoa, Thiothrix and Thiobacilli*--.

IN THE SPECIFICATION:

Column 1, line 38, ""flash"," should be --"flash,"--.

Column 1, line 58, "SulFerox" should be --SULFEROX--.

Column 2, line 65 and 66, "Beggiatoa, Thiothrix and Thiobacilli" should be --*Beggiatoa, Thiothrix and Thiobacilli*--.

Column 5, line 56, "100° F.," should be --100° F,--.

UNITED STATES PATENT AND TRADEMARK OFFICE
CERTIFICATE OF CORRECTION

PATENT NO. : 6,056,934
DATED : May 2, 2000
INVENTOR(S) : Bruce CARLSEN and Allen SONNEVILLE

It is certified that error appears in the above-identified patent and that said Letters Patent is hereby corrected as shown below:

Column 2, line 57, a space should be deleted between FIG. and 1 as to be consistent with FIG. 2 on line 59.

Column 4, line 15, a space should be deleted between "35-40°" and "C" as to be consistent with "25-45° C" on line 14.

Column 4, line 24, "where the either the" should be --where either the-- .

Signed and Sealed this

Seventeenth Day of April, 2001

Attest:

NICHOLAS P. GODICI

Attesting Officer

Acting Director of the United States Patent and Trademark Office